F. P. PETERSON.
GAS PROCESS.
APPLICATION FILED JAN. 5, 1914. RENEWED JAN. 26, 1918.
1,266,621.
Patented May 21, 1918.
2 SHEETS—SHEET 1.
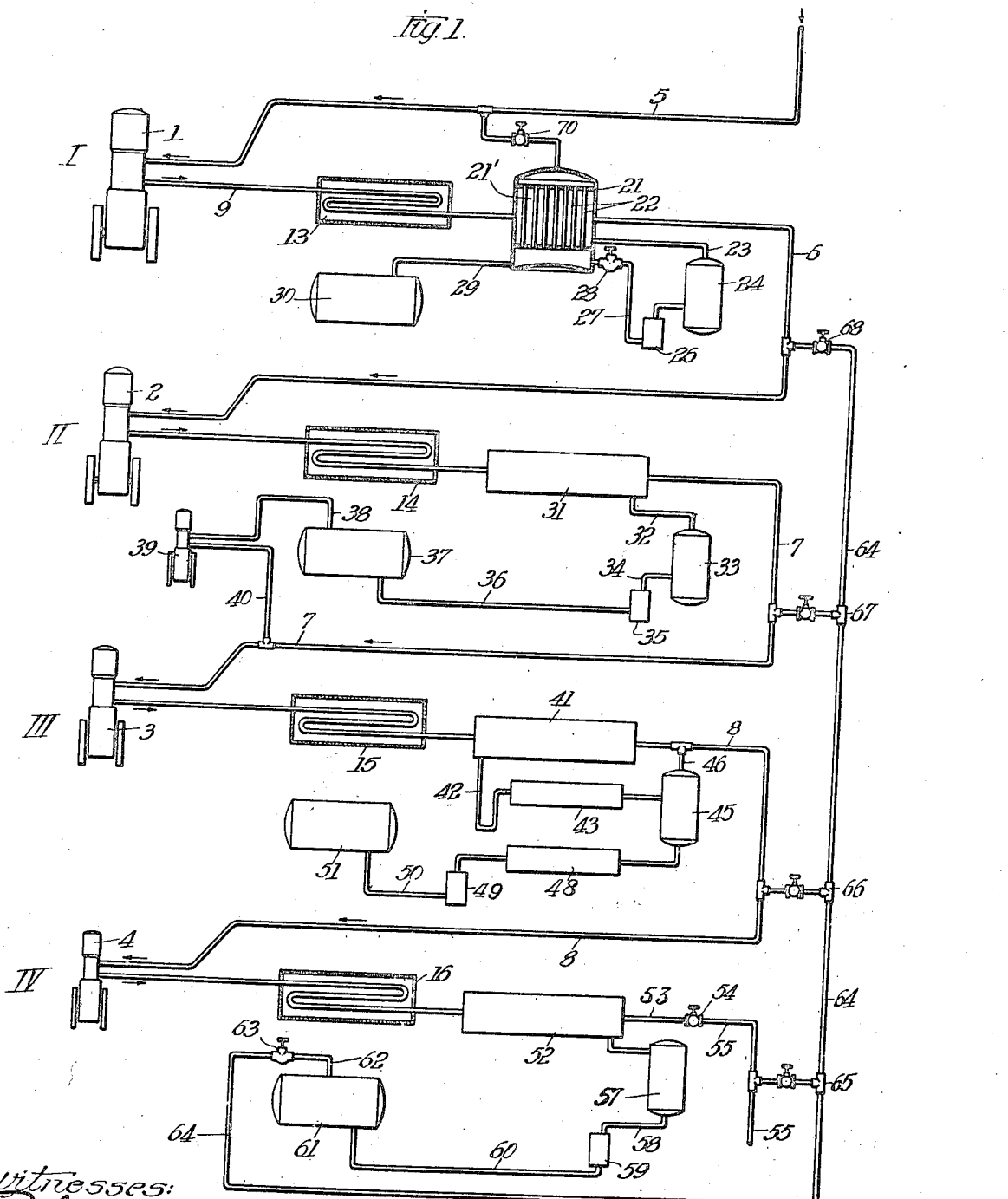

F. P. PETERSON.
GAS PROCESS.
APPLICATION FILED JAN. 5, 1914. RENEWED JAN. 26, 1918.
1,266,621.
Patented May 21, 1918.
2 SHEETS—SHEET 2.
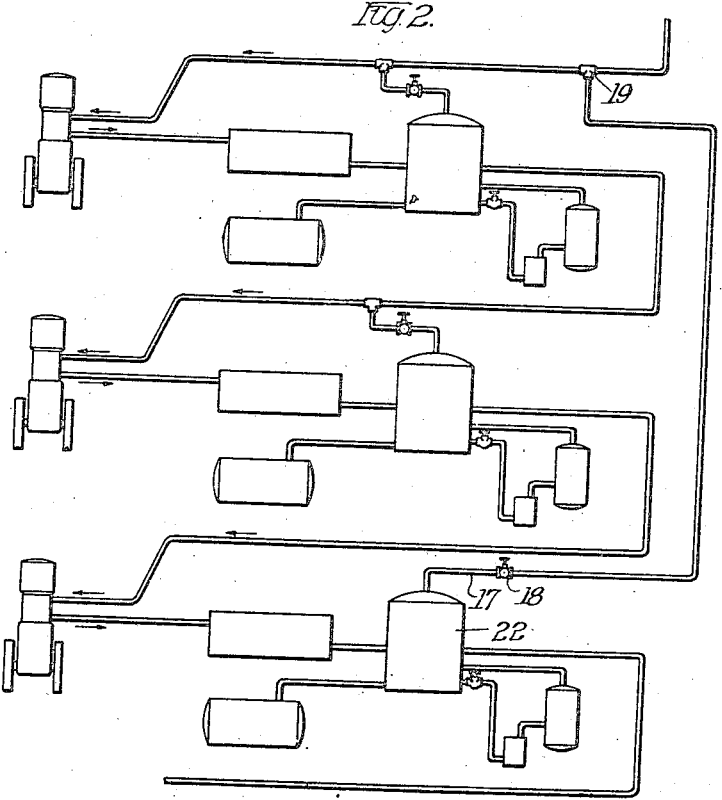
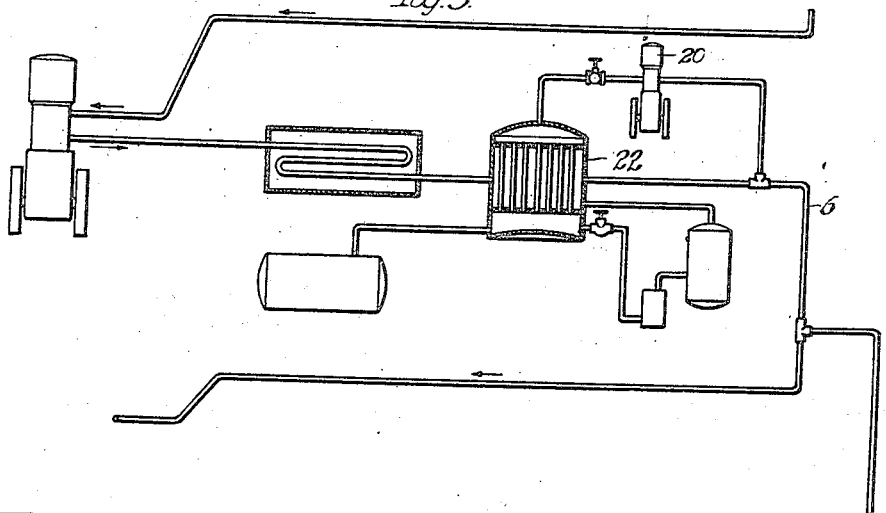

UNITED STATES PATENT OFFICE.

FRANKLIN PIERCE PETERSON, OF TULSA, OKLAHOMA, ASSIGNOR TO CONSOLIDATED LIQUID GAS COMPANY, OF CHICAGO, ILLINOIS, A CORPORATION OF ARIZONA.

GAS PROCESS.

1,266,621.      Specification of Letters Patent.      Patented May 21, 1918.

Application filed January 5, 1914, Serial No. 810,332. Renewed January 26, 1918. Serial No. 214,035.

*To all whom it may concern:*

Be it known that I, FRANKLIN P. PETERSON, a citizen of the United States, residing at Tulsa, in the county of Tulsa and State of Oklahoma, have invented a new and useful Improvement in Gas Processes, of which the following is a specification.

This invention relates to a process for separating out of crude gas, such as for instance oil well gas, some or all of its liquefiable constituents.

In a prior Patent No. 1,031,664, of July 2, 1912, issued to me, I have disclosed a process for obtaining, direct from natural gas, a liquefied gaseous product adapted for commercial use. The present invention concerns a development and an improvement of the process disclosed in my former patent.

Natural gas contains, in addition to some other compounds, methane, ethane, propane, butane, pentane and hexane. Of these pentane and hexane are liquids at ordinary temperatures and atmospheric pressure. Butane, propane and ethane are gaseous under normal conditions of temperature and pressure, but may be liquefied and maintained as liquids at moderate pressures and normal temperatures. Methane cannot exist as a liquid at normal temperature: it is known as a so-called "permanent" gas.

The pressure required to produce a liquid condensate from any gas, as well as the nature of the condensate, depends both upon the substances in the gas and upon their proportions. For instance, from a gas containing propane and ethane, if the proportion of propane is large as compared with ethane, a mixture rich in propane may be obtained with a comparatively low pressure. If, however, the proportion of propane is small as compared with ethane, a considerably higher pressure will be required to liquefy propane and the condensate secured will contain a larger proportion of ethane. When mixtures of two or more gases are involved, enough pressure will frequently have to be applied to bring down a considerable proportion of the higher stage product before it is possible to secure the lower stage product. It is desirable, however, to secure these liquid products as pure as possible and to place them on the market at as low pressures as possible. In the example I have just referred to, using ethane and propane as an illustration, the vapor pressure of the liquid product containing propane and ethane would be considerably higher than that required to hold propane alone in liquid form.

The process disclosed in my former patent contemplated the removal from natural gas of its liquefiable constituents by compressing and cooling the gas, in stages. In carrying out the process, the gas carried through a low stage compression and cooled, which removed as liquids its least volatile constituents. It then passes on to other successive higher pressure stages of the process whereby its other liquefiable constituents were successively removed in an order inverse to that of their volatility. The product obtained from each stage of the process was drawn off into a separate container.

The present invention concerns the same general process but includes a method whereby the contents of each container may be positively and definitely standardized. That is to say, by the application of the method herein disclosed the vapor pressure in each container used to receive the several products of the process may be definitely determined independent of the pressure at which the liquid sent to that container was precipitated. Thus I may use a comparatively high pressure in bringing down the liquid condensate, but I thereafter treat the condensate in such a fashion that its vapor pressure is caused not to exceed a certain definite maximum for a certain definite temperature, which vapor pressure may be considerably lower than the pressure at which the liquid was condensed. Moreover I bring about this result without wasting any particle of the liquefiable constituents of the gas. All liquefiable gaseous constituents which are too volatile to be confinable under the conditions which I set for the product in any container are returned to the process and recovered as liquids at some other stage thereof.

My invention contemplates, as one of its objects, the obtaining of the several constituents of natural gas in a much purer form than has hitherto been possible.

Another object of my invention is to subject each liquefied product obtained in the process to definite temperature and pressure conditions and to allow the escape from the bulk of the liquid of any of its constituents which are unconfinable under such temperature and pressure conditions whereby the product is standardized and its vapor pressure definitely determined.

It is a further object of my invention to obtain as liquefied gases all the liquefiable constituents of the natural gas which are liquefiable at normal temperature and to allow no portion of the liquefiable part of the gas to escape along with the "permanent" gases (such as methane) which are discharged at the end of the process.

In the drawings

Figure 1 is a diagrammatic representation of my process.

Figs. 2 and 3 are modifications thereof.

In the drawings of my process is shown as embodied in four stages, I, II, III and IV; it being of course understood that either more or fewer stages could be used in the process if found necessary or desirable. The supply pipe 5 leads the crude gas to the process from the source of its origin, such as an oil well.

From the pipe 5 the gas goes to compressor 1 wherein it is compressed at a low stage, issuing from the compressor through the pipe 9. It then passes through the cooling device 13, which may be of any form desired (these appliances being well known in the art) and enters the cooler 21. This cooler comprises a central chamber 21', two head spaces at the ends of the central chamber, and a plurality of tubes 22 connecting the head spaces. Under the compression and cooling to which the gas is being subjected, a portion thereof will be condensed as a liquid in the cooler 21. This liquid drains off through the pipe 23 into the collecting tank 24 whence it flows into the trap 26. The trap 26 periodically discharges through the pipe 27 and the reducing valve 28, into the lower head space of the cooler.

Inasmuch as the pressure in the liquid product so separated out has been reduced by the reducing valve 28, a certain portion of the liquid will volatilize and pass up through the tubes 22, the remainder of the liquid passing off through pipe 29 into the first container 30. The volatilization and expansion of the gas in the cooler 21 will cool the gas passing thereinto from the pipe 9, as will readily be understood by those familiar with the art. The gases passing up through the pipes 22, in the modification disclosed in Fig. 1, next pass through a regulating valve 70 and are discharged into the supply pipe 5.

In the modification shown in Fig. 3, the gases passing through tubes 22 in the cooler are led into a small auxiliary compressor 20 and therefrom into the pipe 6. This arrangement avoids the possibility of having these gases condense again in the first stage of compression and cooling as shown in Fig. 1.

The method here shown as employed in the first stage of the process, may be employed in a higher stage, in which case the gases emerging from the tubes 22 of the cooler could be led into any one of the lower stages of the process as illustrated in Fig. 2 wherein the gases are led from cooler 22 through pipe 17 and regulator 18 to discharge into another stage as shown at 19.

It will be apparent that the liquid condensate in container 30, has been rid of all its constituents which have a vapor pressure in excess of that determined by the regulating valve 70 and that the vapor pressure in the container 30 may be thus considerably lower than the pressure at which the liquid was brought down. The contents of container 30 will therefore be a low pressure product, such as for example pentane or butane, substantially pure and rid of practically all the more volatile condensates which may have been brought down in the first stage compression.

From the first stage of my process the gas passes through the pipe 6 into the second compressor 2 where it is compressed at a higher pressure. Emerging from the second compressor 2 it passes through a cooler 14 and then into a settling chamber 31. The liquid product precipitated in chamber 31 is drawn therefrom through pipe 32 into a collecting tank 33 whence it flows through pipe 34 into the trap 35 whence it is periodically discharged through pipe 36 into container 37. A pipe 38 communicates from container 37 to a small auxiliary compressor 39 whose outlet discharges through pipe 40 into pipe 7, the discharge pipe for the second stage of the process as clearly seen in the drawings. The pressure in the container 37 is thus maintained at a predetermined value by means of the auxiliary compressor 39 which pumps off the vapors arising in container 37 and discharges them into the succeeding stage of the process. In this way, the product in container 37 is standardized, its vapor pressure definitely determined, the liquid is again put in a form suitable for market, the cooling effect of the vaporization is availed of to reduce the power required for the compression in compressor 39 and the vapors are discharged into the next higher stage of the process, which eliminates the possibility of their being condensed again in the same stage.

The residue gas from the second stage passes through pipe 7 into compressor 3 whence it passes through cooler 15 into a settling chamber 41. The liquid condensed in settling chamber 41 is led through U-pipe 42 through a heater 43 and into a collecting tank 45. The heater 43 serves to drive off from the condensate brought down in the settling tank 41, any highly volatile or permanent gases dissolved therein which would render the condensate unmanageable under the temperature and pressure conditions under which it is designed to be held. Heater 43 may be of any form, the kind of apparatus being well known in the art. In the tank 45 gaseous products evolved in the heater 43 separate from the liquid and pass up through pipe 46 into pipe 8 which is the discharge pipe for the residue gases for this stage of the process. The liquid in tank 45 passes through a cooler 48 into a trap 49 whence it is periodically discharged through pipe 50 into a third container 51. By this method the most rebellious constitutents of the liquefied product are driven off by heat and the vapor pressure of the product is reduced so that the pressure in container 51 is less than that of compressor 3, whereby again the liquid product is standardized as to vapor pressure and made suitable for commercial handling.

The residue gas from this stage of the process passes through pipe 8 into compressor 4 whence it is passed through cooler 16 into the settling chamber 52. The liquid deposited in chamber 52 passes into a collecting tank 57 whence it flows through pipe 58 into a trap 59, which periodically discharges through pipe 60 into the container 61. The container 61 is in communication, through the pipe 62 and regulating valve 63, with the pipe 64. The pipe 64 may be connected as indicated at 65, 66, 67 and 68, either with the discharge pipe 55 of the gases from the fourth stage of the compressor or with any stage of the process; thus the vapors unconfinable in container 61 under the conditions of temperature and pressure prescribed for that container, may be passed back into the process for retreatment or may be carried off with the unliquefiable "permanent gases," or introduced to a higher stage of the process.

The residue gas from the fourth stage passes through the regulating valve 54 out through the tube 55 to be used either for cooling in the various stages of the process or for use in other portions of the plant. If the method here disclosed in the fourth stage were not applied to the last stage of the process, the residue gas from settling chamber 52 would pass through pipe 53 directly into a higher stage.

While I have shown different treatments for each stage, I wish it to be clearly understood that any one of these treatments might be introduced at any stage of the process. It is obvious that this process is not limited to four stages; either a greater or less number of stages may be used according to the composition of the crude gas and the number of products desired.

Inasmuch as the condensate at each stage of the process is subjected to definite temperature and pressure conditions and the gases unconfinable under those conditions are allowed to escape from the bulk of the condensate, I obtain a standardized product for each stage, that is one, substantially all of which is of the same vapor pressure, and in many cases I obtain a substantially pure product.

I claim:—

1. The process of separating from crude gas its liquefiable constituents by liquefying constituents of the gas in the inverse order of their volatility, collecting the product of each stage of liquefaction separately and subjecting the separate products to predetermined and varying temperature and pressure conditions to allow the escape from each thereof of gases only liquefiable at a higher stage.

2. The process of separating out a plurality of liquefiable gases from crude gas which consists in liquefying constituents in the gas in a plurality of stages in the inverse order of their volatility, subjecting the liquid product from each stage to definite temperature and pressure conditions and returning to the gases which are unconfinable at the temperature and pressure applied to each liquid the unliquefied gases for further treatment.

3. The method of removing liquefiable constituents from a crude gas which consists in compressing the gas to a low pressure, cooling the compressed gas, drawing off the liquefied product into a container, and pumping off the vapors from said container into the intake of a higher stage compressor.

4. The method of separating out the liquefiable constituents of natural gas in stages which consists in compressing the gas to a low pressure, cooling it then compressing it to a higher pressure, drawing the liquefied product of the first compression into a container and allowing the vapors from the container to expand against resistance and discharging them into the intake of the higher stage compressor.

5. The method of separating out the liquefiable constituents of natural gas in stages which consists in compressing the gas to a low pressure, cooling it then compressing it to a higher pressure, drawing the liquefied product of the first compression into a container, maintaining the pressure in the container at a definite pressure and allowing gases in the container unconfinable at such pressure to enter a higher stage of compression.

6. The method of producing a liquefied illuminating gas from natural gas, which consists in passing the gas through a compressor, then through a cooler, draining off the liquefied product, passing said liquefied product back through the cooler and allowing its most volatile ingredients to expand under pressure through the cooler, whereby the compressed gas is cooled and the liquefied product is rendered safe for handling.

7. The method of separating out a liquefied gas from gas which consists in first compressing said gas, then cooling it in a cooler, removing the liquefied product and causing it to flow back through the cooler into a container, and allowing a portion of said liquefied gas to expand against pressure while being cooled, whereby the highly volatile constituents of said gas are permitted to escape and the gas passing through the cooler is cooled.

8. The method of separating out a liquefied gas from natural gas which consists in liquefying a portion of said gas by compressing and cooling, collecting the liquid product and allowing the most volatile portion of said product to expand against pressure into the intake of the compressor.

9. The method of removing liquefiable constituents from crude gas which consists in liquefying said gas in stages, removing the liquefied product of one stage into a container, permitting the escape from the container under definite pressure of gases evolved from or contained in the liquid in the container, into the unliquefied gas for another stage of the treatment.

10. The method of obtaining a liquefied product from crude gas which consists in compressing and cooling the gas, draining off the liquid condensate, heating the liquid, returning the gases evolved by such heating to the unliquefied gases, cooling the liquid and draining it into a container.

11. The method of treating a liquefied product obtained from any stage of a gas liquefying process, which consists in first heating the liquefied product, returning the gases to the unliquefied gas for another stage of the process, then cooling the liquefied products.

In witness whereof, I hereunto subscribe my name to this specification in the presence of two witnesses.

FRANKLIN PIERCE PETERSON.

Witnesses:
   Geo. A. Robertson,
   Ruth Snyder.